United States Patent

Draper

[11] Patent Number: 5,927,742
[45] Date of Patent: Jul. 27, 1999

[54] TRAILER HITCH ALIGNER

[76] Inventor: Robert M. Draper, P.O. Box 4276, Sidney, Ohio 45365-4276

[21] Appl. No.: 08/774,960

[22] Filed: Dec. 27, 1996

Related U.S. Application Data

[60] Provisional application No. 60/010,580, Jan. 25, 1996.

[51] Int. Cl.$^6$ ..................................................... B60D 1/06
[52] U.S. Cl. ........................................... 280/477; 280/511
[58] Field of Search .................................. 280/477, 475, 280/479.3, 491.1, 491.3, 491.5, 511, 508

[56] References Cited

U.S. PATENT DOCUMENTS

| | | | |
|---|---|---|---|
| 2,472,432 | 6/1949 | McCune et al. | 280/508 |
| 4,254,968 | 3/1981 | DelVecchio | 280/477 |
| 4,416,466 | 11/1983 | Park | 280/477 |
| 4,482,166 | 11/1984 | Van Antwerp | 280/508 X |
| 5,114,170 | 5/1992 | Lanni et al. | 280/477 |
| 5,261,687 | 11/1993 | Bergman | 280/478.1 |
| 5,454,582 | 10/1995 | Rines | 280/477 |

Primary Examiner—Robert J. Oberleitner
Assistant Examiner—Pamela J. Lipka
Attorney, Agent, or Firm—William Weigl

[57] ABSTRACT

The invention is an aligning apparatus which can be removably mounted to or built as an integral part of a towable trailer tongue for vertically aligning the inverted socket of the tongue with the mating ball which is conventionally mounted in cantilevered fashion on the rear end of the towing vehicle. The aligning apparatus includes a horizontally-lying V-shaped guide member having the open end of the V facing the drawbar in the operative position. The V-shaped guide member is positioned relative to the socket such that when the socket is at such a height so as to allow the socket to be positioned above the ball, the vertical center of the legs, the height of each leg constituting a camming surface, is at the height of the drawbar. This tongue height is achieved by use of a standard jack mechanism or pin-height adjustable vertical support pole on the trailer tongue. As the towing vehicle is backed up toward the trailer, if the ball is not aligned with the inverted socket, the drawbar will contact the camming surface of one leg of the V and shift the trailer tongue laterally to vertically align the socket with the ball. After alignment of socket with ball, the apparatus is either pivoted from the trailer tongue or removed to a stowed position so as to not interfere with the rear end of the towing vehicle during towing of the trailer around corners.

5 Claims, 3 Drawing Sheets

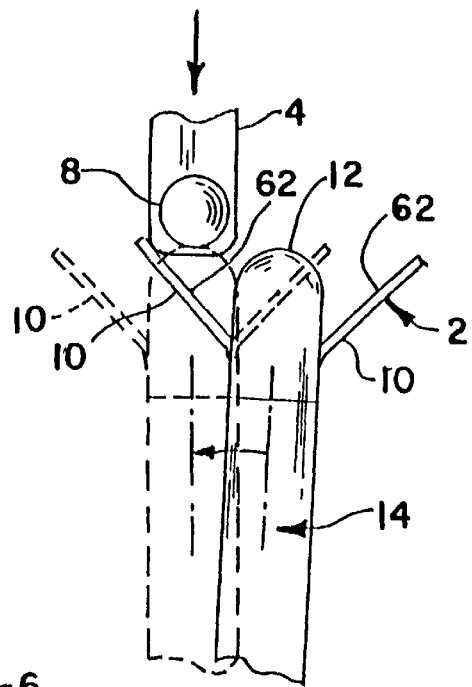
FIG. 1
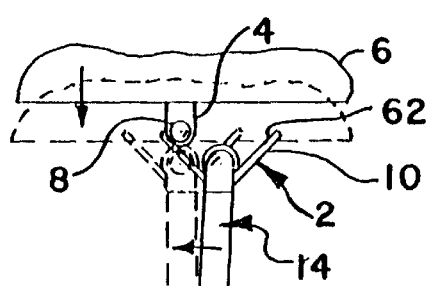
FIG. 2
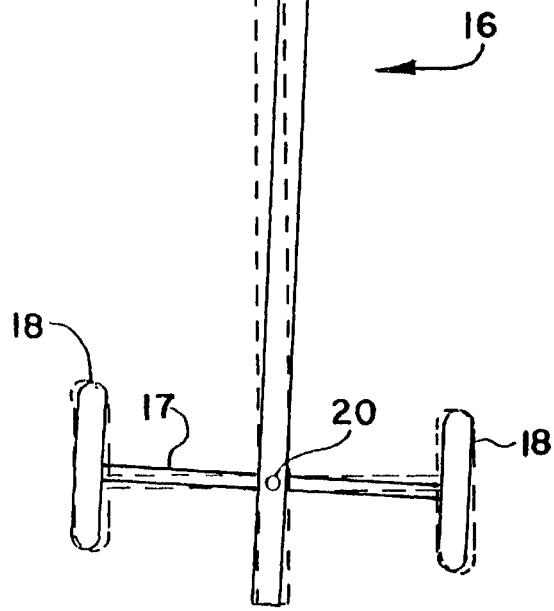

TRAILER HITCH ALIGNER

This application is based on U.S. Provisional Patent Application Ser. No. 60/010580, filed Jan. 25, 1996.

This invention relates to an apparatus for vertically-aligning the inverted socket of a trailer tongue with the upstanding ball on a drawbar attached to the rear end of a towing vehicle.

BACKGROUND OF THE INVENTION

Boating enthusiasts, mobile home owners and other users of trailers know the difficulty of aligning and attaching a trailer to the towing vehicle. In particular, vertically-aligning the inverted socket of a trailer hitch to the mating ball on the drawbar of the towing vehicle is hampered by poor visibility of the trailer hitch and the tow bar when using mirrors and/or physically turning around. A second person can be used as an observer to relay instructions to the driver, but there are times when a second person is not available. Since the towing vehicle typically cannot be manually moved sideways, it is the trailer which must be moved manually into final position for hitching when the two are nearly, but not truly aligned. For small, light-weight trailers, this might not be much of a problem unless, of course the person doing the manual moving has physical difficulty in doing so. The trailer may be physically pulled to where the towing vehicle is parked or the towing vehicle may be backed-up to position the ball as close to alignment with the socket as possible and then the trailer manually moved to bring the socket into final alignment above the ball. These light-weight trailers typically have either an infinitely-adjustable vertical jack or a vertical support pole with fixed pin-adjustable heights to maintain the hitch at a particular height when the trailer is not attached to a towing vehicle. In the case of trailers with the support post, after the ball and socket are positioned, someone must lift the trailer tongue and simultaneously remove a pin which supports the tongue. The socket is then lowered onto the ball, the latch which locks the ball and socket together is locked, the support post is lifted to clear the ground during travel and pinned in place and the safety chains are attached. In the case of trailers which have a jack, the procedure is similar except that rather than lifting the tongue, removing the pin and pinning the support post in the raised position, no lifting is required and the jack is used to lower the socket onto the ball. The jack is then pivoted away from the ground and locked in that position. For larger, heavier trailers, particularly those trailers with multiple sets of axles and tires such as used with mobile homes and large boats, the above procedure is difficult or impossible for one person to do. Typically, someone outside of the vehicle must help direct the vehicle driver so as to position the ball close enough to the mating socket and minimize the amount of manual movement necessary during final-alignment of the ball and socket. If there is nobody to help direct the driver, oftentimes multiple cycles of backing up, exiting the vehicle to check positioning, reentering the vehicle, and repositioning the vehicle are necessary. That consumes time. While most large trailers have a jack with a swivelable ground-contacting wheel to eliminate lifting of the trailer tongue, two people may still be required to pull the socket into position above the ball. The present invention is designed to minimize or eliminate the need for an observer to help direct the tow vehicle driver and to move the trailer socket sideways into vertical-alignment with the ball automatically using the tow vehicle's power.

SUMMARY OF THE INVENTION

The invention is an apparatus for aligning an inverted socket carried on the tongue of a towable trailer with an upstanding ball supported in cantilevered fashion by a drawbar mounted to the rear end of a towing vehicle to enable coupling for towing the trailer. The aligning apparatus comprises a horizontally-lying V-shaped guide member having two diverging horizontal legs, the guide member being mounted below the inverted socket with the vertex of the V formed by the legs lying essentially vertically below the inverted socket. The open end of the V faces the protruding end of the drawbar of the towing vehicle when the towing vehicle and the trailer are to be brought into position for coupling. The legs of the V are vertically related to the inverted socket such that when a trailer jack or vertical post positions the tongue to a level at which the ball and socket are able to be connected, the legs of the guide member are in horizontal alignment with the drawbar. The legs have a vertical depth which provides a relatively wide camming surface on each inner leg enabling the drawbar and the legs to be misaligned horizontally several inches when the vehicle and trailer are being brought into engagement for coupling. Unless the vehicle driver has been fortunate enough to perfectly align the vehicle and trailer, the drawbar contacts one of the camming surfaces and moves the trailer tongue sideways to bring the socket into approximate vertical alignment with the ball. The trailer tongue then can then be lowered to engage the inverted socket with the ball. The V-shaped guide member is subsequently moved to an inoperative position wherein the legs do not interfere with bumper of the towing vehicle during transport. The locking latch on the trailer tongue is then engaged to retain the ball in the socket, the safety chains are attached and the electrical connections made prior to transport.

It is a principal object of the invention to provide an apparatus for vertically aligning an inverted socket on the tongue of a towable trailer with an upstanding ball mounted to a towing vehicle to compensate for horizontal trailer-vehicle misalignment, by using the towing vehicle to move the trailer essentially laterally into alignment.

A further object is to provide an aligning apparatus which can be an add-on to existing trailers or integrated into a trailer frame.

A further object is to provide an aligning apparatus which can be adapted to be used with a wide variety of trailer tongue and hitch designs.

A further object is to provide an aligning apparatus which allows the complete alignment and hitching operation of a towing vehicle to a towable trailer to be accomplished by one individual without undue physical exertion.

A further object is to provide an aligning apparatus which can be made to be selectively retained in and movable between an operational position in which the trailer socket can be horizontally aligned with the towing vehicle ball and a stowed or inoperative position which does not interfere with the towing vehicle when towing the trailer.

A further object is to provide an aligning apparatus which can be made to be removable from the towing vehicle after alignment of towing vehicle and trailer has been achieved, and either stored on the trailer, in the towing vehicle or elsewhere during towing.

A further object is to provide an aligning apparatus which can be made to align the trailer socket with the towing vehicle ball with four inches or more of horizontal misalignment.

A further object is to provide an aligning apparatus which is usable with trailers having an adjustable height support post terminating in a swivelable ground-contacting wheel or with a simple pin-height adjustable vertical support pole.

A further object is to provide an aligning apparatus in conjunction with a jack having a wheel which is positionable so as to enable the tongue end of the trailer to move laterally in response to camming action of the drawbar against a leg of the V.

A further object is to provide an aligning apparatus which can be added to existing trailers or be built as an integral part of a trailer at manufacture.

A further object is to provide an aligning apparatus which can be used with boat trailers and other types of trailers which are frequently hitched and unhitched from the towing vehicle.

A further object is to provide an aligning apparatus which can be used on both heavy and light weight trailers to assist in the aligning and hitching process.

A further object is to provide an aligning apparatus which can be adapted for use on a wide variety of trailer tongue and hitch designs.

Other objects will become apparent from the following description, in which reference is made to the accompanying drawings.

DESCRIPTION OF THE DRAWINGS

FIG. 1 is a schematic plan view showing the towing vehicle drawbar moving the tongue end of a trailer laterally to vertically align the socket and ball as the vehicle is "backed" toward the trailer.

FIG. 2 is a schematic plan view showing the pivotal movement of the whole trailer during the alignment process.

DESCRIPTION OF THE PREFERRED EMBODIMENTS

Figure 4:
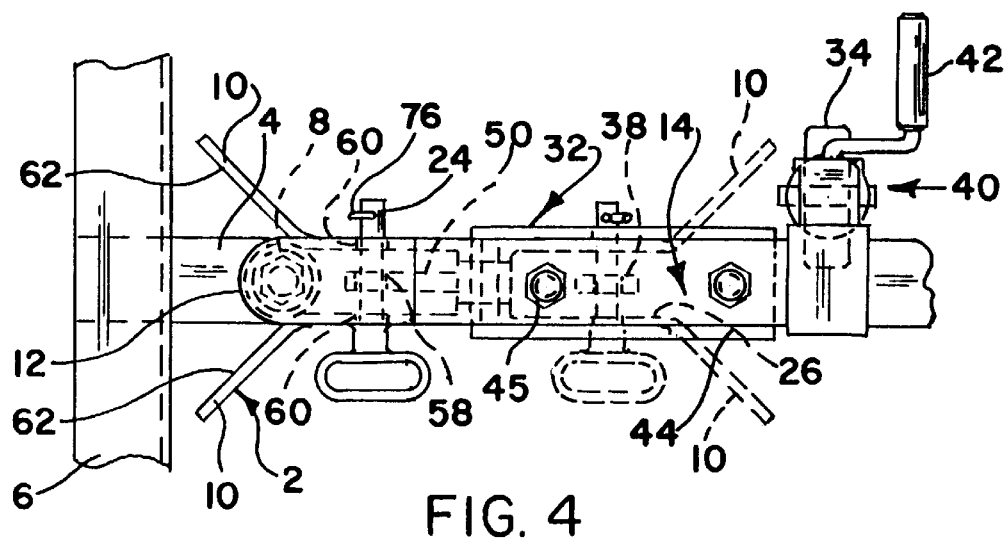
FIG. 4 is a plan view of the preferred version of the invention shown in FIG. 3.

In accordance with this invention and as can be seen schematically in FIG. 1, the invention comprises a horizontal V-shaped guide member 2 having two diverging legs 10, the guide member being attached to a trailer tongue 14 with the vertex of the V being essentially vertically aligned with an inverted socket 12. A drawbar 4 is attached at the rear end of the towing vehicle, simply shown here as a rear bumper 6. An upstanding ball 8 is supported in cantilever fashion by the drawbar 4. As the towing vehicle backs up toward the trailer roughly in alignment therewith, the drawbar 4 contacts the inner face of one of the legs 10. As the towing vehicle continues to back up toward the trailer (in the direction of the arrow), the V-shaped guide member 2 and the trailer tongue 14 to which the guide member 2 is attached are forced or cammed to move laterally relative to the direction in which the towing vehicle is moving until the drawbar 4 reaches the point where it is aligned between the legs 10 and thus the inverted socket 12 is substantially vertically aligned with the ball 8. It should be understood that means other than the drawbar may be made to perform this function, but for convenience and reduced cost, the drawbar can perform a function in addition to just supporting the ball 8. Note that FIG. 1 shows the guide member 2 and trailer tongue 14 moving laterally relative to the direction the vehicle is moving and the drawbar 4 moves essentially in a straight line in the direction of the arrow. When the drawbar 4 has moved the trailer tongue 14 to its dotted-line position, the vehicle and trailer will be longitudinally aligned and ready for coupling. This can normally be accomplished by the driver of the vehicle alone, without the assistance of a second person to audibly or visually signal the driver in backing up to the trailer.

As can best be seen in FIG. 2, which shows the absolute motions of the drawbar 4 and the entire towable trailer 16 relative to the ground reference, the entire trailer 16 pivots about a point 20 on an axle 17 located approximately midway between the tires 18. In order for this pivoting to occur, the trailer should normally be prevented from moving in the direction the towing vehicle is moving. This might not be a problem with heavier trailers carrying a load and multi-axle trailers but unloaded lightweight single axle trailers may need to have one or more wheels chocked for the aligning apparatus to function properly. Additionally, the tongue end of the trailer must be able to move laterally relative to the direction the vehicle is moving. This lateral movement is preferably facilitated, especially on heavier trailers (or those carrying a heavy load) by the presence of a swivelable ground-contacting wheel 34 (See FIGS. 3 and 4). If the trailer tongue 14 is enabled to move laterally by the wheel 34 or by sliding contact with the ground (FIGS. 5 and 6), the trailer 16 can pivot about pivot point 20 until the guide member 2 is centered relative to the drawbar 4, thus aligning the inverted socket 12 with the ball 8.

Figure 3:
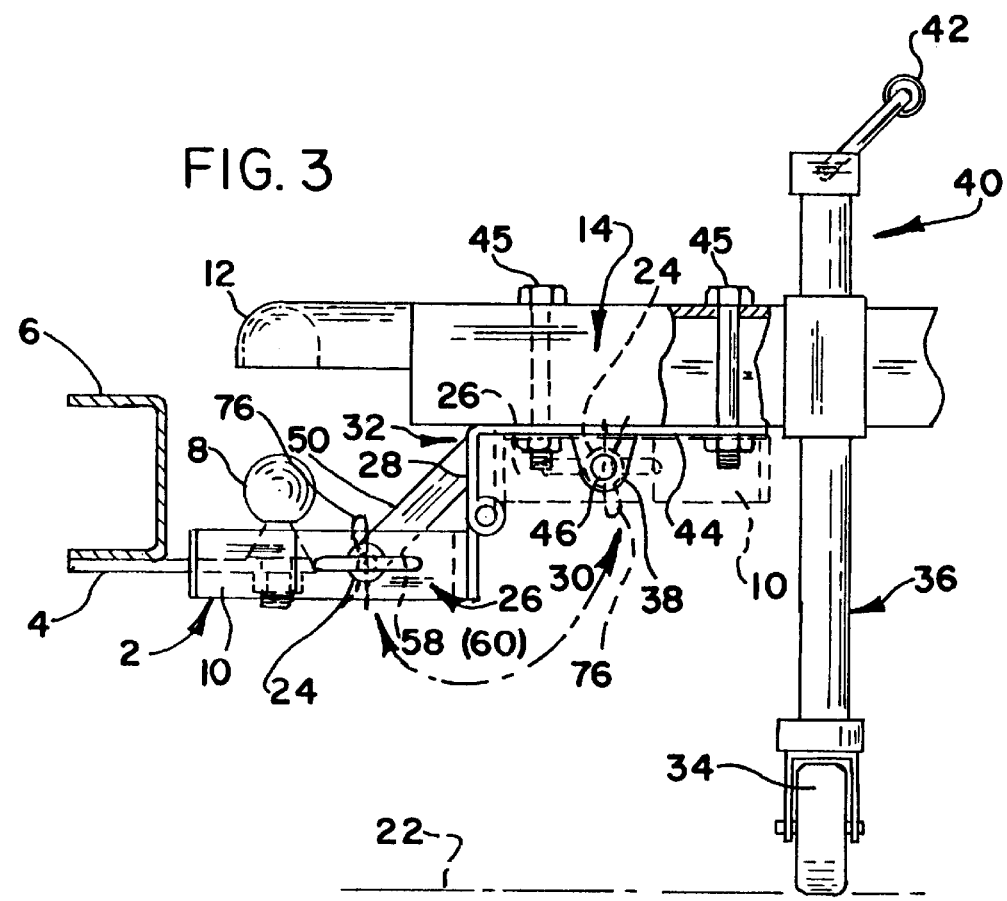
FIG. 3 is a side view of the preferred version of the invention showing the pivoting V-shaped guide member in the operational and stowed positions, the latter being in dotted lines.

The preferred embodiment of the invention is shown in side view FIG. 3 and in top view FIG. 4. The figures show ball 8, which is attached in cantilevered fashion to the rear end of the towing vehicle bumper or frame 6 by drawbar 4, being vertically aligned with the conventional inverted socket 12 of the trailer tongue 14 as would occur after the alignment process is completed. Attached to the tongue 14 is a vertically-adjustable jack 40 having a lower end 36 terminating in a swivelable wheel 34 contacting a surface such as ground 22, asphalt, or concrete. It is particularly important on heavy trailers (or those carrying a heavy load) that the jack have a ground contacting wheel 14 which allows the trailer tongue to move laterally relative to the direction the towing vehicle is moving. Lighter trailers with light loading can use a simple pin-height adjustable vertical pole 66 (See FIGS. 5 & 6) with no ground contacting wheel 34 since the end of the pole contacting the ground 22 can slide relatively easily. The preferred embodiment of the invention comprises a horizontally-lying V-shaped guide member 2 having a U-shaped body portion 26. The spacing between the legs of the U of the body portion 26 is less than the horizontal width of the drawbar 4 so that the drawbar cannot enter the U, as can be seen from FIG. 4. To the ends of the U are attached the pair of diverging legs 10. Each leg 10 has a side facing the opposite leg and comprising a camming surface 62. The body portion 26 has a pair of axial apertures 60, one in each of the opposing sides of the U. A hinge 30 connects the closed end of the body portion 26 transversely to an L-shaped pivot bracket 32 having a horizontal portion 44 and a depending vertical portion 28. Horizontal portion 44 may be attached to the underside of trailer tongue 14 by means of bolts 45 or welding. The vertical portion 28 terminates at the hinge 30. A stow bracket 38 having an aperture 46 is affixed to and extends downwardly from the horizontal portion 44 with the axis of the aperture extending transversely to tongue 14. An operation bracket 50 having an aperture 58 extends downwardly and toward the rear end of the towing vehicle 6 from vertical portion 28 at approximately a 45 degree angle to the ground 22. The axis of the operation bracket aperture 58 also extends transversely to the tongue 14. When the guide member 2 is in the position of FIG. 3, and the vehicle is to be backed toward the trailer, the trailer tongue 14 and socket 12 are jacked to a height so as to allow the ball 8 to be positioned directly below the socket 12. At such time, the guide member 2 will be positioned parallel to the ground 22 and the drawbar 4 will contact one of the camming surfaces 62, preferably at its center. The vertical depth of the guide member tolerates a fair degree of vertical offset of the drawbar 4 and camming surfaces 62. The pivot bracket 32 and guide member 2 are also designed such that a release pin 24 can be inserted through the guide member apertures 60 and operation bracket aperture 58 so as to retain the guide member 2 in the operational position parallel to the ground 22 during the alignment process. After the alignment process is completed, the release pin 24 can be removed from apertures 58 and 60, the guide member 2 pivoted about hinge 30 180 degrees and the release pin 24 reinserted through the guide member apertures 60 and the stow bracket aperture 46 to hold the guide member 2 in the stowed, traveling position. The stowed position prevents the free ends of legs 10 from contacting the rear end of the towing vehicle 6 during towing of the trailer.

Figure 6:
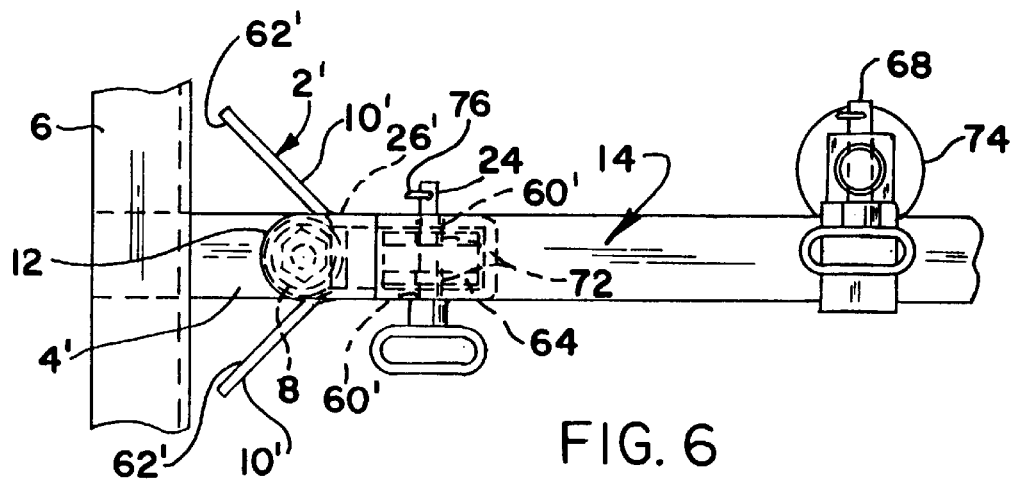
FIG. 6 is a plan view of the alternate embodiment of the invention shown in FIG. 5.
Figure 5:
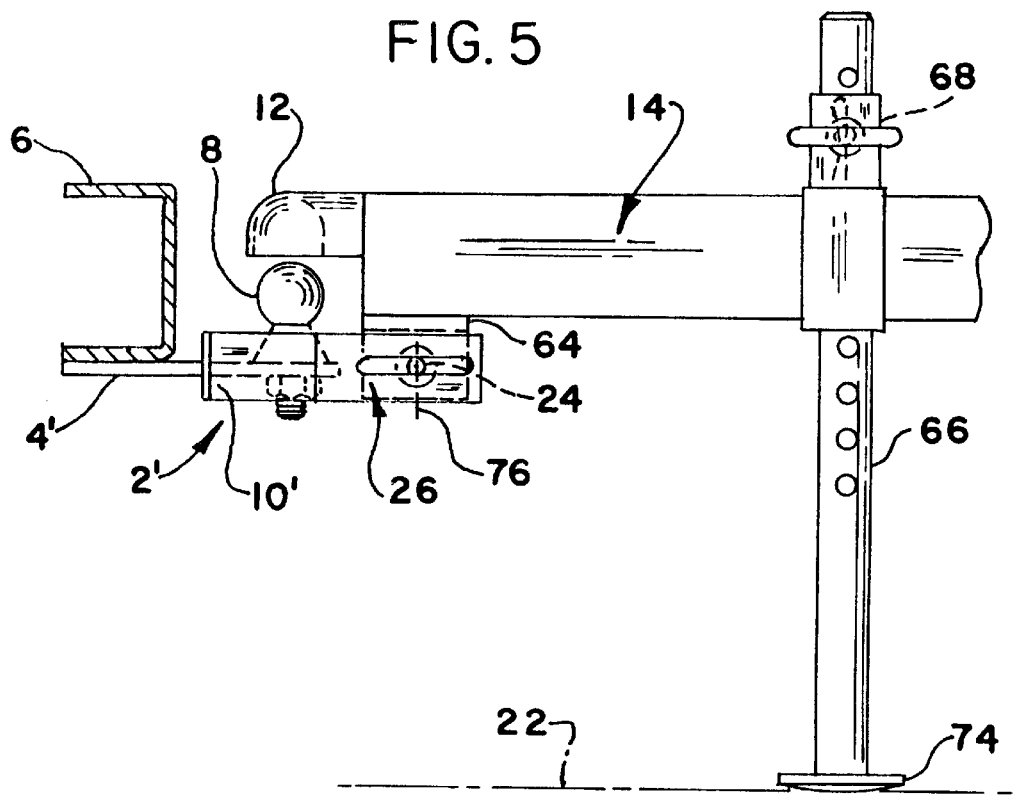
FIG. 5 is a side view of the alternate embodiment of the invention wherein the V-shaped guide member is removable and a jack with a wheel may be used.

FIG. 5 and FIG. 6 show an alternative embodiment of the invention wherein the V-shaped guide member 2' is removable from the trailer tongue rather than pivotable to a stowed position. The guide member 2' is similar to the preferred embodiment guide member except that it has an elongated U-shaped body portion 26' and the pair of axial apertures 60' through opposite sides of the U. The L-shaped pivot bracket 32 of the preferred embodiment is replaced by an inverted U-channel 64 having a pair of axial apertures 72 through opposite walls of the U, the U-channel being attached to the underside of tongue 14 with the open end of the U facing downward toward the ground 22. The operational position of guide member 2' is achieved by positioning body portion 26' around the U-channel 64 with legs 10' facing the rear end of the towing vehicle 6. The guide member 2' is retained and stabilized in the horizontal operational position by inserting release pin 24 through apertures 60' and 72. After alignment has been achieved, the guide member 2' can be removed by pulling release pin 24 from apertures 60' and 72. The guide member 2' is then lowered from U-channel 64 and can be stored in the towing vehicle, on the trailer, or elsewhere during travel. The jack 40 is replaced by a pin height adjustable vertical pole 66 which can raise and lower the tongue 14 by using height adjustment pin 68. To facilitate sliding contact of the lower end of pole 66 with the ground 22, a convex plate 74 may be welded to its lower end.

Operation

Regardless of which version of invention is used, the procedural steps for alignment of the trailer and towing vehicle is similar.

1. Check whether the guide member 2 has been left in the operating position from the last time the trailer was used. If so, then go to step 2. If not, then the V-shaped guide member 2 or 2' should be placed in the operating position.

2. Back-up the towing vehicle, visually aligning it with the trailer 16 until a slight "thunk" is felt and the trailer 16 is seen to move slightly laterally. Preferably the ends of the legs 10 facing the vehicle are about nine or ten inches apart, allowing the vehicle to be misaligned by about four-and-one-half to five inches from the longitudinal axis of the trailer.

3. Get out of the towing vehicle and check if the socket 12 is in vertical alignment with the ball 8. If not, depending on the weight of the trailer, it might be moved by hand the last minute bit. Or, the driver can re-enter the towing vehicle, back-up slightly, and recheck the alignment. In most instances, it is easy enough to grasp the trailer tongue 14 and manually move the trailer socket 12 into position directly above the ball 8.

4. Lower the trailer tongue 14 and socket 12 onto ball 8 by cranking the jack handle 42 in the correct direction. If the trailer 16 does not have a jack 40 but rather has a manual pin-height adjustable vertical pole 66, then grasp the tongue 14 and lift it slightly to remove the weight from height adjustment pin 68. Remove height adjustment pin 68 and lower the tongue 14 and socket 12 onto ball 8. Raise the vertical pole 66 to the highest position off the ground and replace the height adjustment pin 68 to hold the vertical pole in stowed position for traveling.

5. Lock and secure the ball retaining latch on the socket as needed to prevent the trailer 16 from disconnecting from the towing vehicle during transport.

6. Lift the guide member 2 slightly to remove the weight from the release pin 24 and to prevent the guide member 2 from dropping after the release pin 24 is removed, remove the release pin 24 from apertures 58 and 60, pivot the guide member 2 to the stowed position and insert the release pin 24 into apertures 46 and 60. The pin 24 is normally held in either position by a conventional hairpin retainer 76. In the case of the removable guide member 2', the procedure is to grasp guide member 2', remove the release pin 24 from apertures 60' and 72, lower guide member 2' to free it from U-channel 64, reinsert release pin 24 into either apertures 72 or 60' and move guide member 2' to where it is to be stored.

7. Connect the conventional electrical hook-ups and safety chains (not shown).

The procedural steps for detaching the trailer 16 from the towing vehicle can be readily understood from the foregoing descriptions of the described embodiments and need not be described in detail.

The aligning apparatus is primarily intended for use with boat trailers due to the frequency of hook-ups with that type of trailer, but can be used with other types of trailers including mobile homes and house trailers. If the device is used on heavy trailers such as house trailers which have heavy weight on the jack, there should be a ground contacting wheel positioned laterally to the trailer tongue so as to facilitate lateral movement of the trailer tongue during the alignment process. The aligning apparatus can be an add-on to existing trailers such as a bolt-on version or can be built as an integral part of the trailer as the trailer is being manufactured. Note that while the figures show the guide member contacting the drawbar in order to vertically align the trailer socket with the ball, a separate member other than the drawbar could be used to contact the guide member and thus achieve alignment of the socket with the ball. Also, the length of the legs of the guide member may need to be varied depending on the type of trailer and towing vehicle so as to provide the widest margin of misalignment and yet not interfere with the rear end of the towing vehicle during the hitching process. While the figures show a particular trailer design, it should be understood that the basic inventive concept can be adapted to work on a wide variety of trailer designs, tongue designs, jack/vertical height adjustment devices, towing vehicles and hitch designs.

Various other changes may be made without departing from the spirit and scope of the claims.

Having described my invention, I claim:

1. An apparatus for aligning an upstanding ball of a towing device with a mating downwardly open inverted socket affixed to a tongue of a trailer to be towed, said towing device including a relatively narrow width drawbar mounted to the rear end of a towing vehicle and extending rearwardly substantially parallel to the longitudinal axis of the vehicle, said trailer tongue having a jack for vertically adjusting the tongue and raising it off the ground when the trailer is unhitched from the towing vehicle, said aligning apparatus comprising:

a V-shaped guide member having an open end facing said drawbar and having a U-shaped body portion the width of which body portion between opposite sides of the U is of less width than the drawbar, said guide member including a pair of angularly diverging legs extending from the ends of the U, each leg comprising a camming surface adapted to be engaged by said drawbar, and;

mounting means attached to the trailer tongue, said mounting means holding the V-shaped guide member in an operative aligning position wherein the guide member is horizontally-lying with the camming legs facing the towing vehicle during a hitching operation, the vertex of the V lying in substantially vertical alignment with the inverted socket such that when the trailer tongue and inverted socket are jacked to such a vertical height so as to allow the ball to be located directly below the socket, the drawbar can contact the center of the camming surface upon movement of the towing vehicle and drawbar toward the trailer tongue to shift the trailer tongue and socket into vertical alignment with the upstanding ball; said mounting means further including a pivot bracket having a depending portion attached to a lower portion of the trailer tongue adjacent said socket, and means hinging said guide member to said pivot bracket so as to allow pivoting of the guide member from its operative position during a hitching operation to a second, stowed position wherein the legs of the V are remote from the rear of the towing vehicle.

2. The aligning apparatus of claim 1 wherein said mounting means further includes means to selectively retain the V-shaped guide member in either the operative position or in the stowed position.

3. The aligning apparatus of claim 2 wherein said selective retaining means includes a removable pin.

4. The aligning apparatus of claim 3 wherein said mounting means further includes apertures extending through opposite sides of the U-shaped body portion of the V-shaped guide member, a stow bracket affixed to the bracket and having an aperture therethrough the axis of which extends transversely to the trailer tongue and is in such a relation with the guide member apertures as to be coaxially aligned therewith when the guide member is in the stowed position, and an operation bracket affixed to the pivot bracket and extending toward the towing vehicle, the operation bracket having an aperture therethrough the axis of which extends transversely to the trailer tongue and is in such relation with the guide member apertures as to be coaxially aligned therewith when the guide member is in the operative position.

5. The aligning apparatus of claim 1 wherein said operative and stowed positions are approximately 180 degrees apart.

\* \* \* \* \*